(12) United States Patent
Prado

(10) Patent No.: US 6,244,062 B1
(45) Date of Patent: Jun. 12, 2001

(54) SOLAR COLLECTOR SYSTEM

(76) Inventor: David Prado, 2322 W. 36th St., Chicago, IL (US) 60609

(*) Notice: Subject to any disclaimer, the term of this patent is extended or adjusted under 35 U.S.C. 154(b) by 0 days.

(21) Appl. No.: 09/451,223

(22) Filed: Nov. 29, 1999

(51) Int. Cl.[7] ............................................. F25B 27/00
(52) U.S. Cl. ........................................ 62/235.1; 136/206
(58) Field of Search ........................... 62/235.1, 238.1; 136/248, 206; 165/48.2

(56) References Cited

U.S. PATENT DOCUMENTS

| | | | |
|---|---|---|---|
| 4,149,525 | * | 4/1979 | Prado ................................. 126/271 |
| 4,249,520 | * | 2/1981 | Orillion . |
| 4,376,435 | * | 3/1983 | Pittman ........................ 62/235.1 X |
| 4,448,039 | * | 5/1984 | Hutchins ............................ 62/235.1 |
| 4,553,402 | * | 11/1985 | Cramer Sr. ......................... 62/235.1 |
| 4,607,132 | * | 8/1986 | Jarnagin ............................. 136/248 |
| 4,616,487 | * | 10/1986 | Franklin ............................. 62/235.1 |
| 4,720,170 | * | 1/1988 | Learn Jr. . |
| 4,744,224 | * | 5/1988 | Erickson ............................ 62/235.1 |
| 4,798,056 | * | 1/1989 | Franklin ............................ 62/235.1 |
| 4,966,014 | * | 10/1990 | Erickson ............................ 62/235.1 |
| 5,177,977 | * | 1/1993 | Larsen ................................ 62/235.1 |
| 5,269,851 | * | 12/1993 | Horne ................................. 136/248 |
| 5,452,710 | * | 9/1995 | Palmer .......................... 136/248 X |
| 5,666,818 | * | 9/1997 | Manrique-Valadez .............. 62/235.1 |
| 6,080,927 | * | 6/2000 | Johnson ................................. 136/248 |

OTHER PUBLICATIONS

Richard M. Dumais; excerpt from *Introduction to Anhydrous Ammonia*; The Ammonia Refrigeration Technicians Association; publication date unknown.
*Small Ammonia Refrigerator*, publication date unknown.
*Ammonia Nh3 OSHA Description*; The Ammonia Refrigeration Technicians Association; May 1996.
A.J. Rydzewski and Warren W. Rice; *Mechanical Refrigeration*; publication date unknown.

* cited by examiner

*Primary Examiner*—Corrine McDermott
*Assistant Examiner*—Chen-Wen Jiang
(74) *Attorney, Agent, or Firm*—Greer, Burns & Crain, Ltd.

(57) ABSTRACT

A solar collector system for converting solar radiation to thermal energy and electricity has an upper cover with a material that is transparent to solar radiation. A solar energy absorbing structure is disposed under the upper cover and has a heat conducting material such as metal. In addition, a first heat transfer system is disposed in contact with the solar energy absorbing structure and has a material that transfers heat from the solar energy absorbing structure to a first substance flowing within the first heat transfer system. The solar collector system also has electric cells that absorb solar radiation and convert it into electricity. The cells are configured and disposed on at least a portion of the upper cover.

32 Claims, 3 Drawing Sheets

SOLAR COLLECTOR SYSTEM

BACKGROUND

The present invention relates generally to a solar collector system for utilizing solar radiation, and in particular, a solar collector system that uses a conductor for warming both water and air conditioning coolant while also using photo cells for generating electricity.

A known dome covered solar collector is disclosed in U.S. Pat. No. 4,149,525 to Prado and is hereby incorporated by reference. This type of solar collector has a sheet of energy absorbing material that has the shape of a step pyramid and is enclosed in a transparent dome. A continuous coil of heat conducting tubing or pipe winds around the pyramid collector. Fluids that pass through the pipe are warmed by heat transferred from the solar collector and through the wall of the pipe. The solar collector has a dome to trap more heat within a cavity between the solar collector and the dome, to reduce convective radiation loss. As a result, the known domed solar collector provides heated fluids for a residential building while eliminating reliance on external connections to a fuel source for heating water, such as natural gas.

The known dome covered solar collector, however, does not include an apparatus for generating electricity to run household equipment such as motors or fans for air conditioners, furnaces or other appliances. A residence using the known domed pyramid solar collector must still use another separate source for a supply of electricity. If an electric company is the outside source supplying the electricity, the residence is dependant upon the actions of that electric company, which could be inconvenient and/or expensive.

In the alternative, a separate solar panel or wind driven electric generator may ultimately be less expensive than a connection to an electric company, but the initial costs may be higher due to installation and equipment required. In addition, both the solar and wind electric generator systems may be difficult to erect and aesthetically unappealing.

The known solar systems also do not provide a method for independent air conditioning systems that do not rely on outside sources for fuel or electricity. More specifically, in conventional mechanical absorption refrigeration systems that use ammonia as the coolant, the ammonia is heated to change the state of the coolant from liquid to vapor or gas in a generator for more efficient release of the heat outside of the area that is to be cooled. The generator is used instead of, or in addition to, a compressor. These systems require a connection to a supply of heating fuel or electricity to run a burner to heat the coolant.

Accordingly, it is an object of the present invention to provide an improved solar collector system that enables a residential building to be more independent of separate gas and electric supplies.

More specifically, an object of the present invention is to provide an improved solar collector system with a dome covered pyramid solar collector that generates electricity to run appliances while also generating heat to provide hot water and air conditioning.

A further object of the present invention is to provide an improved solar collector system with a transparent dome with photovoltaic cells used to generate electricity.

An additional object of the present invention is to provide an improved solar collector system with two separate circuits of piping around a pyramid collector so that one separate heat transfer system is used to change the state of a coolant for use in an air conditioner while the other heat transfer system heats water.

These and other objects of the present invention are discussed or will be apparent from the detailed description of the invention.

SUMMARY OF THE INVENTION

In keeping with one aspect of the invention, a solar collector system is used for converting solar radiation to thermal energy and electricity. This system has an upper cover with a material that is transparent to solar radiation. A solar energy absorbing structure is disposed under the upper cover and has a heat conducting material. A first heat transfer system is disposed in contact with the solar energy absorbing structure and has a material that transfers heat from the solar energy absorbing structure to a first substance flowing within the first heat transfer system. In addition, cells that absorb solar radiation are configured and disposed on at least a portion of the upper cover. The cells use solar radiation to generate electricity.

In another aspect of the present invention, the first heat transfer system has air conditioning coolant flowing within first pipes made of a material that transfers heat from the solar energy absorbing structure to the air conditioning coolant. Heating the coolant changes the state of the coolant. The coolant then passes over a condenser for efficient release of the heat outside of the area to be cooled.

In an alternative aspect, a second heat transfer system is disposed in contact with the solar energy absorbing structure and has a material that transfers heat from the solar energy absorbing structure to a second substance flowing within the second heat transfer system. The second substance has a different chemical composition than a chemical composition of the first substance. In one embodiment, for example, the first substance is water and the second substance is a coolant for air conditioning, such as ammonia.

BRIEF DESCRIPTION OF THE DRAWING

The above mentioned and other features of this invention and the manner of obtaining them will become more apparent, and the invention itself will be best understood by reference to the following description of a preferred embodiment of the invention in conjunction with the drawings, in which.

DETAILED DESCRIPTION

The above-listed objects are met or exceeded by the present solar collector system which has the following preferred configuration.

Figure 1:
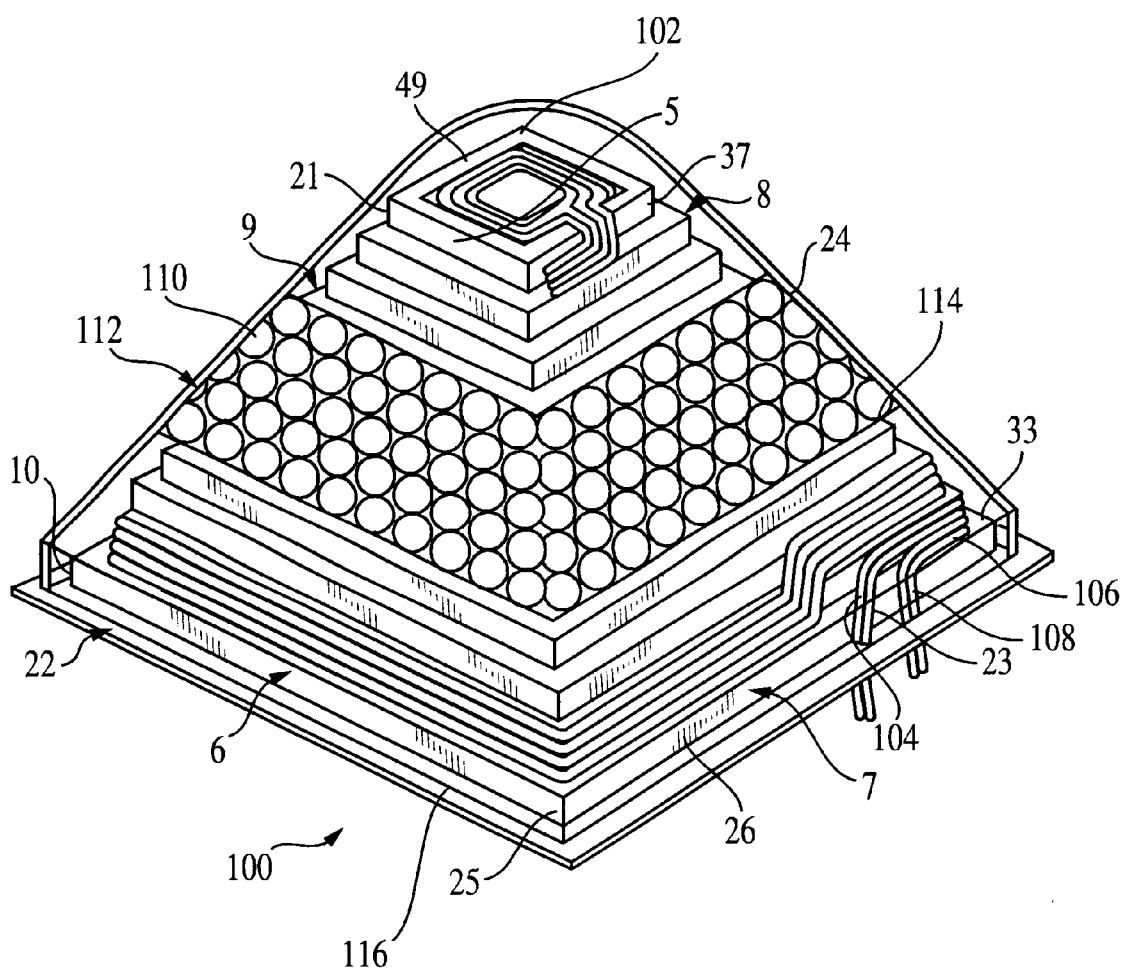
FIG. 1 is a perspective view of the solar collector system according to the invention.

FIG. 1 is a perspective view of the solar collector system 100, which is an improvement of the solar collector described in U.S. Pat. No. 4,149,525 to Prado, incorporated by reference in its entirety. The solar collector system 100 has a solar energy absorbing structure or collector 102 disposed in an enclosure formed by a domed upper cover 24 and a lower cover 55 (not shown in the present figures). The collector 102 is preferably a sheet of heat conducting material in the shape of a step pyramid with a plurality of steps 10–21 having vertical faces 26–37 and horizontal faces 38–49. The preferred shape of the pyramid is a truncated right square step pyramid with the bottom step 10 being a four foot square while each step is preferably three inches high and three inches less in width from an adjacent lower step, to form a pyramid approximately three feet high. The upper cover 24 is preferably a 40 inch high, dome shaped glass or clear plastic material such as plexiglass that is transparent to solar radiation. The dome shape of the upper cover 24 has an aerodynamic design so that dust does not rest on the cover The sheet of heat conducting material of the collector 102 is preferably a metal such as copper, but can be aluminum or any other heat conducting material. While the thickness of a copper sheet is not critical to the invention, 0.02 inches thick provides sufficient rigidity at a minimum cost.

The collector 102 also rests on a base plate 22 made of any rigid material, but preferably metal. The preferred configuration of the interior of the collector 102, base plate 22 and lower cover 55 are disclosed in the '525 patent and will not be repeated here, except to note that the collector 102 may be hollow or filled with heat insulating material, and that the lower cover 55 is preferably heat insulating also.

Figure 2:
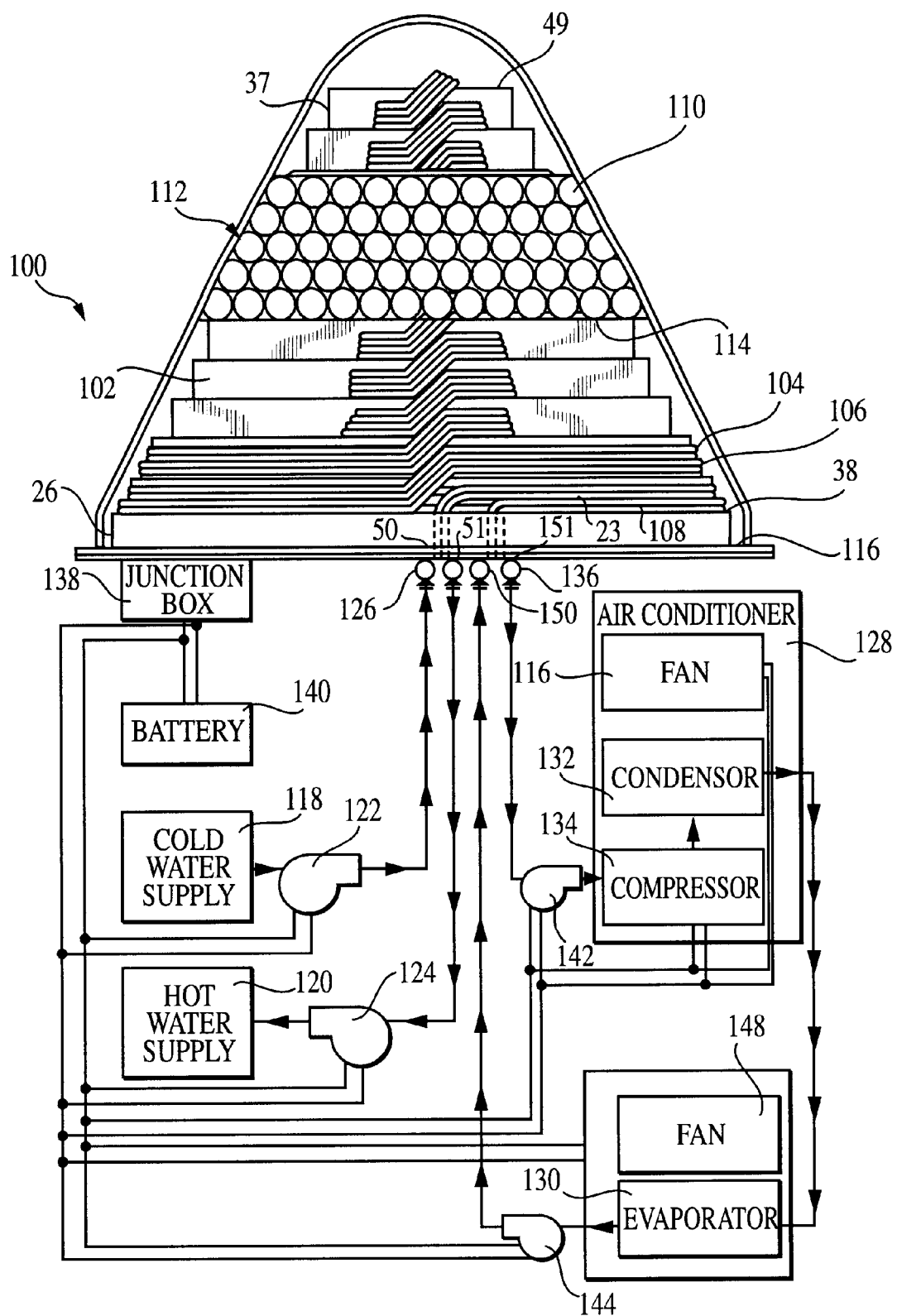
FIG. 2 is a diagram showing the appliances connected to a solar collector system according to the invention including a side elevational view of the solar collector system.

FIG. 2 is a diagram showing appliances and distribution systems connected to the solar collector system 100 according to the invention, and includes a side elevational view of the solar collector system. Two separate heat transfer systems 104 and 106 transfer heat from the collector 102. A first heat transfer system 104 has first pipes 23 made of heat conducting material, and a second heat transfer system 106 has second pipes 108 also made of heat conducting material. The material is preferably a metal such as copper.

Each set of pipes 23 and 108 are configured in generally parallel fashion and are disposed in separate double continuous reverse flow coils that surround and contact each of the steps 10–21, whether a vertical face 26–37 or a horizontal face 38–49.

The diameter of the piping is preferably ½" or less, so that both the inflow and outflow pipes of each double reverse flow coil 23, 108 can be placed in contact with each step. It will be appreciated that other sizes for the pipes are contemplated for the preferred embodiment, as long as both the inflow and outflow pipes of each double reverse flow coil of pipes 23, 108 will fit on each step. In a three foot high pyramid, approximately 340 feet of piping is required for each heat transfer system 104, 106 for a total of 680 feet. It will also be appreciated, however, that other configurations are possible. For example, pipes 23, 108 could alternate steps or skip steps instead of the configuration in the preferred embodiment.

The first heat transfer system 104 transfers heat from the solar energy absorbing structure 102 to a first substance flowing within the first heat transfer system, while the second heat transfer system 106 transfers heat from the solar energy absorbing structure to a second substance flowing within the second heat transfer system. In the preferred embodiment, one of the substances is water or water treated with anti-corrosion and/or antifreeze additives. The other substance is preferably a coolant such as ammonia for a conventional absorption air conditioner.

The pipes 23 and 108 enter and exit through sealed openings in the base plate 22. The first pipes 23 are connected to a cold water supply 118, a hot water storage 120, and pumps 122, 124. The first pipes 23 may also be connected to a conventional heat storage system which includes temperature sensing devices, photoelectric sensing devices, auxiliary energy sources and a further distribution system (not shown). The rate of flow through the pipes 23 may be controlled by valves 126 or other known methods.

As depicted in FIG. 2, the second pipes 108 are preferably connected to a conventional absorption air conditioner 128 that requires the heating of a coolant, such as ammonia, to change it from liquid to vapor or gas for more efficient condensation at a condenser 132. This type of air conditioner may or may not have a compressor 134 for further efficient condensing of the vapor. The flow of coolant may be controlled by valves 136. Second pipes 108 may also have pumps 142, 144 to maintain flow. In an alternative embodiment, only one double reverse flow coil with first pipes 23 is provided and the coil is used to flow the air conditioning coolant rather than water. Furthermore, it will be appreciated that any chemical or composition that is used for coolant and requires heating could be used as coolant rather than ammonia in this system.

Referring again to FIGS. 1 and 2, the upper cover 24 also has photovoltaic cells 110 that absorb solar radiation disposed on at least a portion of the upper cover 24 to generate electricity. The cells 110 are preferably arranged in a horizontal band 112 around the upper cover 24 and are attached to an interior face of the upper cover 24 by adhesion. It will be appreciated that other types of solar cells or small solar panels that generate electricity could be used. It will also be appreciated that the cells 110 can be attached to the upper cover 24 by other means rather than adhesion, and that the cells may be attached to the exterior or embedded within the upper cover 24 instead of attached to an interior face.

The cells 110 are preferably opaque while being at least partially transparent to allow some solar radiation to penetrate through the cells to reach the collector 102. The vertical width of the band 112 is preferably 3/10 the height of the upper cover and is positioned so that the lower periphery 114 of the band 112 is positioned generally 2/5 of the height of the upper cover from the bottom 116 of the upper cover 24.

Referring again to FIG. 2, the cells 110 are connected to wires (not shown) that lead to a junction box 138 by conventional methods. The junction box is preferably connected to a battery 140, motors in pumps 122, 124 for running the water through the first pipes 23, pumps 142, 144 for running the coolant through second pipes 108, fan 146 in the air conditioner 128 and a furnace/duct fan 148, also by conventional methods.

It will be appreciated that other electrical appliances, motors, outlets etc. can be connected to the junction box 138 so that the entire electrical supply for the residential building can potentially originate from the cells 110 rather than electric lines leading to an electric company, separate solar panels or wind driven generators. The band 112 of cells 110 are expected to supply approximately over 500 watts to approximately 2 kilowatts of electricity. This is enough electricity to power a heater motor or a typical air conditioner motor. Line voltage of 110 v at 6 amps can also be supplied. In another embodiment, instead of a junction box 138, the cells 110 can be used to supply current directly to an appliance by conventional methods.

Figure 3:
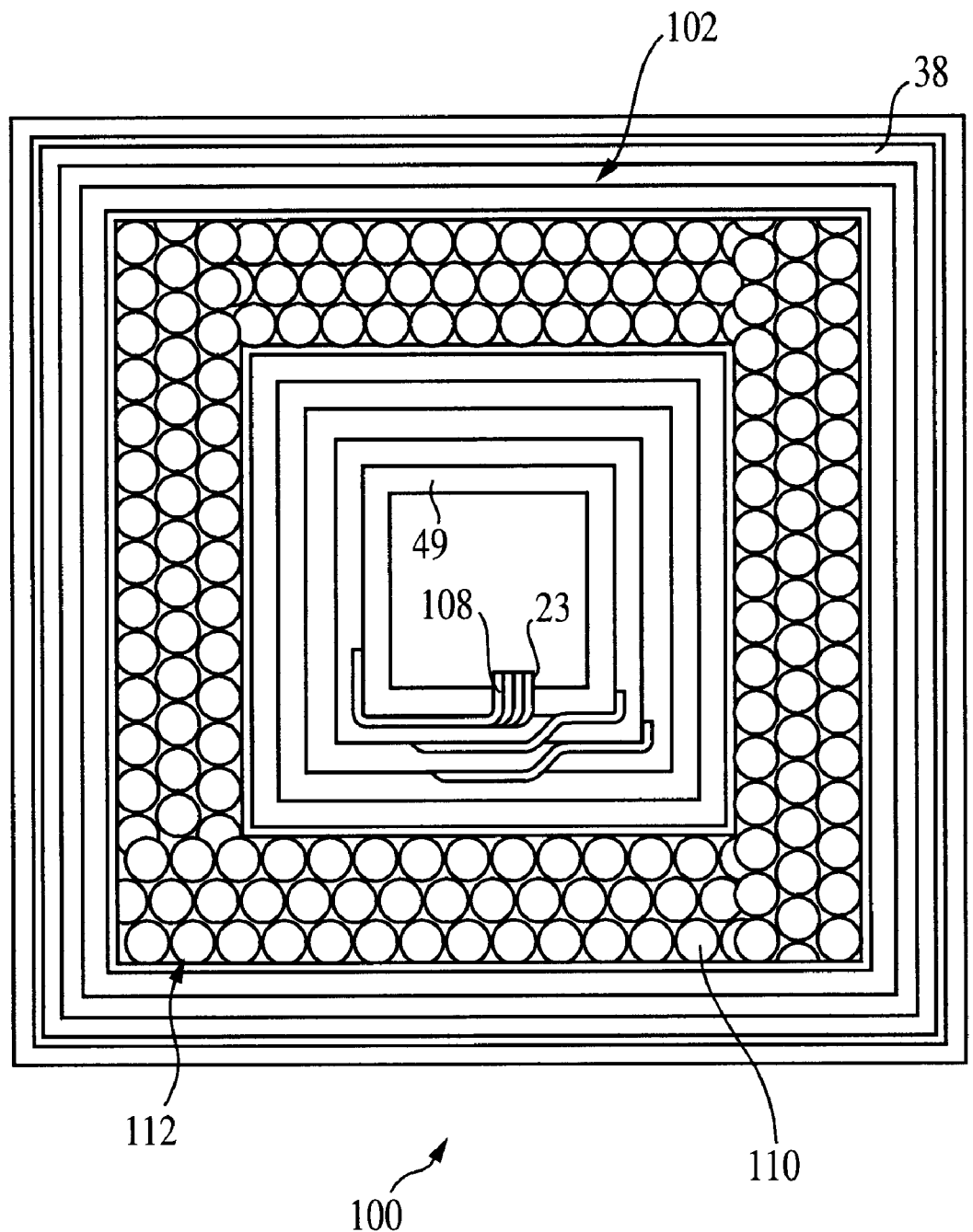
FIG. 3 is a top view of the solar collector system.

FIG. 3 is a top view of the collector system 100 and depicts the top view of the band 112 in a ring. With this configuration, generally, the orientation of the solar collector system 100 is not important for positioning the cells since the cells 110 are symmetrically positioned on all four sides of the solar collector system. It will be appreciated that while the band 112 is the preferred configuration for the cells, other configurations are possible as long as the cells face the sun at least a portion of the upper cover 24.

Referring again to FIG. 1, the positioning of the solar collector system 100 for maximum heat generation for the two heat transfer systems 104, 106 is unimportant in warm climates, such as the southern U.S. In the northern U.S., however, where relatively low average temperatures prevail, it is preferred to orient the collector 102 such that edge 25 formed by the intersection of sides 6 and 7 is pointed south. In this embodiment, sides 7 and 8 will collect radiation in the early morning hours. The vertical faces 26–37 of each step will be the predominant collecting surface because of the position of the sun during this period. Some radiation will be reflected onto the horizontal faces 38–49. As the sun rises, both horizontal and vertical faces will receive direct sunlight. Some of the radiation will be absorbed by the copper surface of the collector 102 and some radiation will be reflected onto another surface. During the middle portion of the day, sides 6 and 7 will comprise the major collecting surfaces. In the late afternoon, sides 6 and 9 will be the major collecting surfaces. Again, because of the position of the sun, the vertical faces of these sides will receive the majority of the solar radiation.

In yet another embodiment, select portions of the horizontal faces 38–49, vertical faces 26–37 and pipes 23, 108 are coated with a black material such as black paint to increase absorption and decrease reradiation or reflectivity of the treated surface. It will be appreciated that the entire collector could be coated with black material.

The operation should now be apparent to those skilled in the art. During daylight hours, the entire surface of the collector 102 is heated while the cells 110 absorb solar radiation and convert it to electricity, which flows to junction box 138. The electricity generated by the cells 110 is received by the junction box 138 and stored in a battery 140. Pumps 122, 124,142 and 144; fans 146, 148 and compressor 134 all receive electricity from the battery 140 or junction box 138 by conventional methods.

In the first heat transfer system 104, a pump 122 pumps cold water from a supply 118, to the coil 23 at pipe 50 (shown in FIG. 2). While ascending and then descending through each step of the collector 102, the heat absorbed by the collector is transferred to the substance or liquid contained in the pipes 23. Then the recently heated water exits the coil 23 through pipe 51 (also shown in FIG. 2). A pump 124 may pump the heated water to a hot water supply 120 or other water fixtures (not shown), such as bathtubs, sinks, and showers, for example.

In the second heat transfer system 106, liquid or vapor ammonia carrying heat received from the evaporator 130 is carried through pipe 150 into coil pipes 108. The collector 102 acts as a generator for the typical absorption ammonia air conditioner. The collector 102 filter heats the ammonia to change the state of the ammonia from a warm liquid/vapor to hot gas. While the generator in the solar collector system 100 generally replaces a compressor, this gas could also be compressed by a compressor 134 for even further efficient release of heat. After being received by the air conditioner, the heat is released from the gas by flowing it through the condensor 132 and past fan 146. The condensor changes the hot gas back to a cold liquid, which then proceeds back to the evaporator 130. Other components of the conventional absorption ammonia air conditioner known in the art are not shown. It will be appreciated that other coolants that require heating could be substituted for the ammonia.

The many advantages of this invention are now apparent. A small solar collector system 100 has photovoltaic cells 110 on the domed upper cover 24 to generate electricity for large appliances while the collector 102 heats water in first pipes 23 for hot water and heaters, and heats coolant in second pipes 108 for air conditioning so that a residential building can potentially be independent of connections to utility companies.

While various embodiments of the present invention have been described, it should be understood that other modifications, substitutions and alternatives may be apparent to one of ordinary skill in the art. Such modifications, substitutions and alternatives can be made without departing from the spirit and scope of the invention, which should be determined from the appended claims.

What is claimed is:

1. A solar collector system for converting solar radiation to thermal energy and electricity, comprising:

an upper cover having a material that is transparent to solar radiation;

a solar energy absorbing structure disposed under said upper cover and having a heat conducting material;

a first heat transfer system disposed in contact with said solar energy absorbing structure and having a material that transfers heat from said solar energy absorbing structure to a first substance flowing within said first heat transfer system;

cells that absorb solar radiation, said cells being configured and disposed on at least a portion of said upper cover, said cells converting said solar radiation into electricity;

wherein said upper cover is a dome and said cells are arranged in a horizontal band around said dome, said dome further including a bottom and a top, and wherein said band further has a vertical width that is generally $3/10$ the height of said upper cover, and said band further includes a lower periphery positioned generally $2/5$ of the height of said upper cover from said bottom of said upper cover.

2. The solar collector system according to claim 1, wherein said solar energy absorbing structure is a sheet of said heat conducting material formed into the shape of a pyramid, and wherein said first heat transfer system further includes first pipes forming a double reverse flow coil spiraling around said pyramid.

3. The solar collector system according to claim 2, wherein said pyramid is a right step pyramid having a plurality of steps with vertical and horizontal faces, said faces forming generally right angles, wherein said first pipes generally conform to said shape of said step pyramid and contact each successive step of said step pyramid.

4. A solar collector system according to claim 1, wherein said first substance is a coolant used in an air conditioner.

5. A solar collector system according to claim 4, wherein said coolant is ammonia.

6. A solar collector system for converting solar radiation to thermal energy and electricity, comprising:

an upper cover having a material that is transparent to solar radiation;

a solar energy absorbing structure disposed under said upper cover and having a heat conducting material;

a first heat transfer system disposed in contact with said solar energy absorbing structure and having a material that transfers heat from said solar energy absorbing structure to a first substance flowing within said first heat transfer system; and cells that absorb solar radiation: said cells converting said solar radiation into electricity;

wherein said cells are further attached to an interior face of said upper cover.

7. The solar collector system according to claim 6, wherein said solar energy absorbing structure is a sheet of said heat conducting material formed into the shape of a pyramid, and wherein said first heat transfer system further includes first pipes forming a double reverse flow coil spiraling around said pyramid.

8. The solar collector system according to claim 7, wherein said pyramid is a right step pyramid having a plurality of steps with vertical and horizontal faces, said faces forming generally right angles, wherein said first pipes generally conform to said shape of said step pyramid and contact each successive step of said step pyramid.

9. A solar collector system according to claim 6, wherein said first substance is a coolant used in an air conditioner.

10. A solar collector system according to claim 9, wherein said coolant is ammonia.

11. A solar collector system for converting solar radiation to thermal energy and electricity, comprising:
    an upper cover having a material that is transparent to solar radiation;
    a solar energy absorbing structure disposed under said upper cover and having a heat conducting material;
    a first heat transfer system disposed in contact with said solar energy absorbing structure and having a material that transfers heat from said solar energy absorbing structure to a first substance flowing within said first heat transfer system;
    cells that absorb solar radiation, said cells being configured and disposed on at least a portion of said upper cover, said cells converting said solar radiation into electricity; and
    a second heat transfer system disposed in contact with said solar energy absorbing structure and having a material that transfers heat from said solar energy absorbing structure to a second substance flowing within said second heat transfer system.

12. The solar collector system according to claim 11, wherein said second substance is a coolant for an air conditioning system, and heating of said second substance changes the physical state of said second substance for cooling air.

13. The solar collector system according to claim 12, wherein said first substance is water and said second substance is ammonia.

14. The solar collector system according to claim 11, wherein said first heat transfer system further includes first pipes and said second heat transfer system further includes second pipes positioned in generally parallel orientation to said first pipes.

15. The solar collector system according to claim 14, wherein said solar energy absorbing structure is a sheet of said heat conducting material formed into the shape of a pyramid, and wherein said first pipes and said second pipes are both double reverse flow coils spiraling around said pyramid.

16. The solar collector system according to claim 11, wherein said solar energy absorbing structure is a sheet of said heat conducting material formed into the shape of a pyramid, and wherein said first heat transfer system further includes first pipes forming a double reverse flow coil spiraling around said pyramid.

17. The solar collector system according to claim 16, wherein said pyramid is a right step pyramid having a plurality of steps with vertical and horizontal faces, said faces forming generally right angles, wherein said first pipes generally conform to said shape of said step pyramid and contact each successive step of said step pyramid.

18. A solar collector system according to claim 11, wherein said first substance is a coolant used in an air conditioner.

19. A solar collector system according to claim 18, wherein said coolant is ammonia.

20. A solar collector system for converting solar radiation to thermal energy, comprising:
    an upper cover having a material that is transparent to solar radiation;
    a solar energy absorbing structure disposed under said upper cover and having a heat conducting material;
    a first heat transfer system disposed in contact with said solar energy absorbing structure having air conditioning coolant flowing within first pipes made of a material that transfers heat from said solar energy absorbing structure to said air conditioning coolant, wherein heating said coolant changes the state of said coolant; and
    cells that absorb solar radiation, said cells configured and disposed on at least a portion of said upper cover, said cells converting said solar radiation into electricity.

21. The solar collector system according to claim 20, wherein said solar energy absorbing structure is a sheet of said heat conducting material formed into the shape of a pyramid, and wherein said first pipes further form a double reverse flow coil spiraling around said pyramid.

22. The solar collector system according to claim 21, wherein said pyramid is a right step pyramid having a plurality of steps with vertical and horizontal faces, said faces form generally right angles, wherein said first pipes generally conform to said shape of said step pyramid and contact each successive step of said step pyramid.

23. A solar collector system according to claim 20, wherein said upper cover further has the configuration of a dome and said cells are disposed in a horizontal band around said dome.

24. A solar collector system for converting solar radiation to thermal energy, comprising:
    an upper cover having a material that is transparent to solar radiation;
    a solar energy absorbing structure disposed under said upper cover and having a heat conducting material;
    a first heat transfer system disposed in contact with said solar energy absorbing structure having air conditioning coolant flowing within first pipes made of a material that transfers heat from said solar energy absorbing structure to said air conditioning coolant, wherein heating said coolant changes the state of said coolant; and
    a second heat transfer system separate from said first heat transfer system, said second heat transfer system including second pipes disposed in contact with said solar energy absorbing structure and having a material that transfers heat from said solar energy absorbing structure to a substance flowing within said second heat transfer system.

25. The solar collector system according to claim 24, wherein said coolant is ammonia and said second substance is water.

26. The solar collector system according to claim 24, wherein said second pipes are positioned in generally parallel orientation to said first pipes.

27. The solar collector system according to claim 24, wherein said solar energy absorbing structure is a sheet of said heat conducting material formed into the shape of a pyramid, and wherein said first pipes further form a double reverse flow coil spiraling around said pyramid.

28. The solar collector system according to claim 27, wherein said pyramid is a right step pyramid having a plurality of steps with vertical and horizontal faces, said faces form generally right angles, wherein said first pipes generally conform to said shape of said step pyramid and contact each successive step of said step pyramid.

29. A solar collector system for converting solar radiation to thermal energy comprising:
- an upper cover having a material that is transparent to solar radiation,
- a solar energy absorbing structure disposed under said upper cover and having a heat conducting material;
- a first heat transfer system disposed in contact with said solar energy absorbing structure and having a material that transfers heat from said solar energy absorbing structure to a first substance flowing within said first heat transfer system;
- a second heat transfer system disposed in contact with said solar energy absorbing structure and having a material that transfers heat from said solar energy absorbing structure to a second substance flowing within said second heat transfer system, said second substance having a different chemical composition than a chemical composition of said first substance; and
- said solar energy absorbing structure is a sheet of said heat conducting material formed into the shape of a pyramid, and wherein said first heat transfer system further includes first pipes forming a first double reverse flow coil spiraling around said pyramid, and wherein said second heat transfer system further includes second pipes forming a second double reverse flow coil spiraling around said pyramid, said first pipes being disposed generally parallel to said second pipes.

30. The solar collector system according to claim 29, wherein said pyramid is a right step pyramid having a plurality of steps with vertical and horizontal faces, said faces forming generally right angles, wherein said first pipes and said second pipes generally conform to said shape of said step pyramid and contact each successive step of said step pyramid.

31. A solar collector system according to claim 29, further comprising cells that absorb solar radiation, said cells configured and disposed on at least a portion of said upper cover, said cells converting said solar radiation into electricity.

32. A solar collector according to claim 31, wherein said upper cover further has the configuration of a dome and said cells are disposed in a horizontal band around said dome.

* * * * *